United States Patent
Fieremans

(10) Patent No.: US 11,956,326 B2
(45) Date of Patent: Apr. 9, 2024

(54) METHOD OF DETERMINING A LOCATION OF A CLIENT IN A PRIVATE NETWORK AND COMMUNICATION NETWORK

(71) Applicant: Unify Patente GmbH & Co. KG, Munich (DE)

(72) Inventor: Geert Robert Marc Fieremans, Boca Raton, FL (US)

(73) Assignee: Unify Patente GmbH & Co. KG, Munich (DE)

( * ) Notice: Subject to any disclaimer, the term of this patent is extended or adjusted under 35 U.S.C. 154(b) by 152 days.

(21) Appl. No.: 17/773,633

(22) PCT Filed: Nov. 13, 2019

(86) PCT No.: PCT/US2019/061142
§ 371 (c)(1),
(2) Date: May 2, 2022

(87) PCT Pub. No.: WO2021/096497
PCT Pub. Date: May 20, 2021

(65) Prior Publication Data
US 2022/0394104 A1 Dec. 8, 2022

(51) Int. Cl.
*H04L 67/52* (2022.01)
*H04L 61/2575* (2022.01)

(52) U.S. Cl.
CPC .......... *H04L 67/52* (2022.05); *H04L 61/2575* (2013.01)

(58) Field of Classification Search
CPC . H04L 61/2575; H04L 61/2514; H04L 67/52; H04L 63/107; H04L 51/222
See application file for complete search history.

(56) References Cited

U.S. PATENT DOCUMENTS

| 8,265,068 B2 * | 9/2012 | Olshansky | H04L 12/66 709/224 |
| 9,742,727 B1 * | 8/2017 | Griggs | H04L 61/2503 |
| 10,057,412 B1 * | 8/2018 | Salour | H04M 3/54 |

(Continued)

OTHER PUBLICATIONS

International Search Report for PCT/US2019/061142 dated Feb. 13, 2020.

(Continued)

*Primary Examiner* — Madhu Woolcock
(74) *Attorney, Agent, or Firm* — Buchanan Ingersoll & Rooney PC

(57) ABSTRACT

A location of a client in a private network where the client has a plurality of interfaces for using a plurality of internet gateways for coupling with the public internet can be determined by sending, from the client, a plurality of STUN BINDING requests to a STUN server connected to the public internet that each exit through an individual internet gateway, receiving, at the client, a plurality of STUN BINDING responses from the STUN server that each include public IP address mapped to the internet gateway through which the STUN BINDING request has exited the private network, sending, from the client, a plurality of location requests that each include a mapped public IP address and the corresponding private IP address, to a location server for looking up location data for the respective private IP addresses so the client can receive location data relating to the public IP addresses.

11 Claims, 1 Drawing Sheet

(56) References Cited

U.S. PATENT DOCUMENTS

| | | | |
|---|---|---|---|
| 10,237,840 B2 | 3/2019 | Rehmat et al. | |
| 2005/0232189 A1* | 10/2005 | Loushine | H04W 64/00 370/328 |
| 2005/0259637 A1* | 11/2005 | Chu | H04L 41/12 370/352 |
| 2006/0215652 A1* | 9/2006 | Strandridge | H04L 61/2575 370/389 |
| 2007/0078986 A1* | 4/2007 | Ethier | H04L 69/24 709/227 |
| 2007/0253418 A1* | 11/2007 | Shiri | H04L 61/2514 370/392 |
| 2008/0243822 A1* | 10/2008 | Campbell | G06F 16/9537 707/999.005 |
| 2008/0259943 A1* | 10/2008 | Miyajima | H04L 61/2575 370/401 |
| 2008/0281949 A1 | 11/2008 | Aborn | |
| 2009/0097477 A1* | 4/2009 | Zhu | H04L 65/1043 370/352 |
| 2009/0323559 A1* | 12/2009 | Chen | H04L 61/2517 370/259 |
| 2012/0137011 A1* | 5/2012 | Yoon | H04L 69/14 709/228 |
| 2013/0059604 A1* | 3/2013 | Zhu | H04W 64/00 455/456.2 |
| 2014/0073355 A1* | 3/2014 | Ward | H04W 4/02 455/456.2 |
| 2014/0310397 A1* | 10/2014 | Tseng | H04L 61/25 709/224 |
| 2019/0380020 A1* | 12/2019 | Pellegrini | H04W 4/025 |

OTHER PUBLICATIONS

Written Opinion of the International Searching Authority for PCT/US2019/061142 dated Feb. 13, 2020.
"Best Current Practice for Communications Services in Support of Emergency Call" by B. Rosen, et al. dated Jun. 2009 (XP15062638A).
"NENA VoIP Recommended Method(s) for Determining Location to Support Emergency Calling Technical Information Document (TID)", Prepared by: National Emergency Number Associate (NENA) VoIP Location Working Group; Draft May 30, 2006 (XP62162280A).
"Use of Device Identify in HTTP-Enabled Location Delivery (HELD)" by J. Winterbottom, et al., Mar. 2011 (XP15075915A).

\* cited by examiner

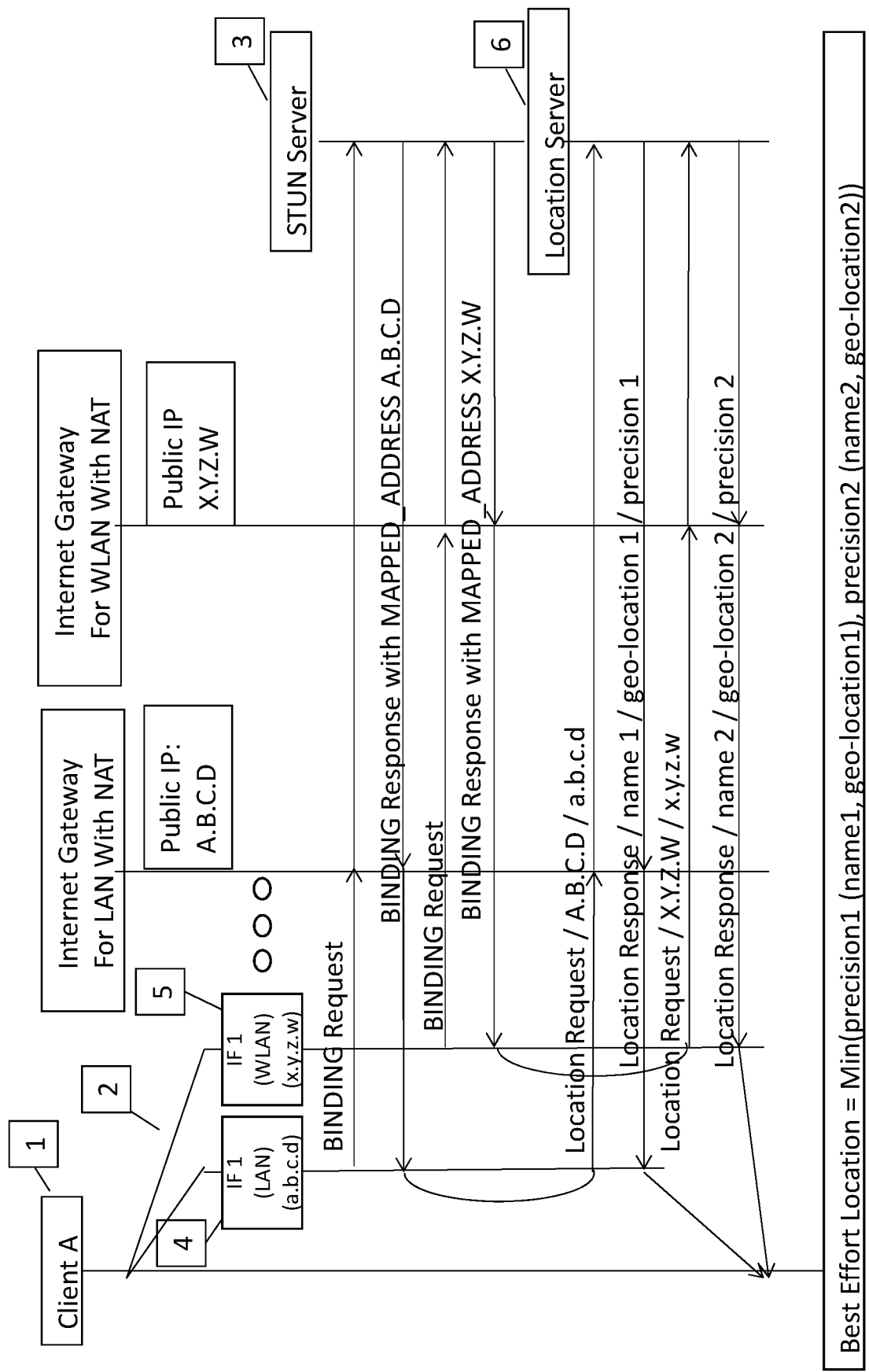

METHOD OF DETERMINING A LOCATION OF A CLIENT IN A PRIVATE NETWORK AND COMMUNICATION NETWORK

CROSS-REFERENCE TO RELATED APPLICATIONS

This application is the United States national phase under 35 U.S.C. § 371 of PCT International Application No. PCT/US2019/061142, filed on Nov. 13, 2019.

FIELD

The present invention relates to a method of determining a location of a client in a private network and a communication network adapted to carry out the method of determining a location of a client in a private network.

BACKGROUND

Location services are critical, e.g., in the event of an emergency, when making an emergency call. In order to provide fast and efficient help, the emergency services need to know the exact location of the caller. Less critical, but equally important for accurate reporting, when analyzing data, the location of data sources is often necessary to offer location filtered views.

If GPS is not available, exact locations of clients to an application can be determined via their use of an IP address for their communication with other clients. For public IP addresses, a rough location can be determined by consulting, e.g., an on-line IP location service API. However, clients at home or within corporations usually use private IP addresses, defined as IP addresses in one of the following ranges: 10.0.0.0/8, 172.16.0/12, 192.168.0.0/16. Merely from just a private IP address as mentioned above, locations cannot be determined.

SUMMARY

Therefore, the present invention is based on the object to provide a method of determining a location of a client within a private network, and a corresponding communication system according to which the client's location may be easily and precisely determined, in particular, for providing location data in the event of an emergency.

The object is solved by a method of determining a location of a client in a private network having the features according to claim 1, and a communication network having the features according to 11. Preferred embodiments of the invention are defined in the respective dependent claims.

Thus, according to the present invention, a method of determining a location of a client in a private network is provided, the client having a plurality of interfaces for using a plurality of internet gateways for coupling with the public internet, wherein the method comprises the steps of
 sending, from the client, a plurality of STUN BINDING requests to a STUN server connected to the public internet, each of the requests exiting through an individual internet gateway of the plurality of internet gateways,
 receiving, at the client, a plurality of STUN BINDING responses from the STUN server, each STUN BINDING response of the plurality of STUN BINDING responses comprising a public IP address mapped to the internet gateway through which the STUN BINDING request has exited the private network,
 sending, from the client, a plurality of location requests, each location request comprising a mapped public IP address and the corresponding private IP address, to a location server for looking up location data for the respective private IP addresses, and
 receiving, at the client, a plurality of location responses from the location server, each location response of the plurality of location responses comprising location data relating to the public IP mapped public IP addresses and corresponding private IP addresses.

By the inventive method, thus, it is possible to obtain a very reliable and precise location information on the location of a client within a private network. Rather than tracking the path the media takes, according to the present invention, the determination of the location data is based on all potential paths that are available to the client so as to obtain the best effort location data.

According to a preferred embodiment of the invention, the step of sending the STUN BINDING request to STUN server comprises sending the STUN BINDING request via a first interface and a first internet gateway. It should be appreciated that embodiments of the STUN server can be configured as a computer device having at least one processor connected to a non-transitory computer readable medium (e.g. flash memory, a hard drive, etc.). Embodiments of the first internet gateway can also be configured as a computer device or a communication device that includes at least one processor connected to at least one non-transitory computer readable medium and also has at least one transceiver unit having a receiver and a transmitter.

According to another preferred embodiment of the invention, the first internet gateway is an internet gateway for LAN with NAT.

Preferably, the step of sending the STUN BINDING request to the STUN server further comprises sending the STUN BINDING request via a second interface and a second internet gateway.

According to a further preferred embodiment of the invention, the second internet gateway is an internet gateway for WLAN with NAT.

It also is advantageous, if the location data comprises a location name and corresponding geolocation data, in particular, latitude data and longitude data specifying the geographic location.

According to still another preferred embodiment of the invention, the location data is retrieved from at least one table stored on the location server, wherein in the at least one table, private IP address ranges within the private network are mapped to their respective public egress internet gateway's IP addresses to a defined location with a precision range value, in particular, indicated in meters.

Moreover, according to a further preferred embodiment of the invention, a location determination service provided on the location server uses Geo IP lookup tables to determine the location for public egress internet gateway's IP addresses for which no tables are available.

Preferably, the method further comprises a step of selecting, from a plurality of location data received from the location server for a plurality of private IP addresses and corresponding mapped public IP addresses, the location data with the lowest precision range value.

Also, the method may further comprise a step of transmitting the selected location data to an emergency service.

Moreover, according to the present invention, a communication network is provided, comprising at least one client in a private network, a STUN server and a location server, wherein the at least one client is configured so as to carry out the method of determining a location of a client in a private network.

Other details, objects, and advantages of the telecommunications apparatus method will become apparent as the following description of certain exemplary embodiments thereof proceeds.

BRIEF DESCRIPTION OF THE DRAWINGS

The invention and embodiments thereof will be described below in further detail in connection with the drawing.

FIG. 1 schematically illustrates an exemplary embodiment of a communication apparatus to illustrate an exemplary embodiment of a method of determining a position of a client in a private network according to an embodiment of the invention is carried out.

DETAILED DESCRIPTION OF EXEMPLARY EMBODIMENTS

FIG. 1 schematically illustrates how the method of determining a position of a client in a private network is carried out according to an embodiment of the invention.

Generally, according to the method of determining a position of a client A, indicated by reference numeral 1 in FIG. 1, the most precise or best effort location of a user using the client A on a private network 2 may be obtained by sending a STUN BINDING request from the client A to a public internet STUN server 3, whereby for sending the request, all interfaces available to the client A are used. The STUN server 3, in response to each STUN BINDING request received from the client A, sends a resulting MAPPED-ADDRESS together with the interface's IP address to the client A, which the client A then sends to a location server 6 which provides a location determination service. The location server 6 will then return the recorded location for each request and the client A obtains the most precise location by taking the result with the highest precision range (lowest number).

It should be appreciated that the client A can be a communication terminal (e.g. a smart phone, a laptop, an electronic tablet, etc.) that has hardware that includes at least one processor connected to a non-transitory computer readable medium (e.g. flash memory, etc.) and at least one wireless transceiver (e.g. a cellular transceiver a local area wireless network transceiver, such as a WiFi transceiver, and a near field communication transceiver (e.g. a Bluetooth transceiver)). Each interface of the client A can include a respective transceiver in some embodiments. The non-transitory computer readable medium of client A can include at least one application stored thereon that defines a method that is performed by the client A when the application is run by the processor.

Embodiments of the STUN server can also be communication device that includes hardware. The hardware can include at least one processor connected to a non-transitory computer readable medium (e.g. flash memory, etc.) and at least one transceiver. The non-transitory computer readable medium of the STUN server can include at least one application stored thereon that defines a method or other type of functionality that is performed by the STUN server when the application is run by the processor.

It should be appreciated that embodiments of the location server 6 can be a communication device that includes hardware. The hardware can include at least one processor connected to a non-transitory computer readable medium (e.g. flash memory, etc.) and at least one transceiver. The non-transitory computer readable medium of the location server 6 can include at least one application stored thereon that defines a method or other type of functionality that is performed by the location server 6 when the application is run by the processor.

The location determination service may be on premise (for example, in a corporate intranet) or in the public cloud, i.e., in the internet, and is populated with tables mapping the corporation's private IP address ranges to their respective public egress internet gateway's IP addresses to a defined (named) location with a precision range in meters (or other pre-specific unit such as, e.g., kilometers or centimeters) and possible other attributes for the location, as for example, geo-coordinates, corporate departments, and the like. Precision ranges may be very accurate for individually wired interfaces or wider ranges defined by deployed wireless access points. The location determination service uses Geo IP lookup tables to determine the location for public egress internet gateway's IP addresses for which no tables were uploaded, as this is typical, for example, for IP addresses used for home routers where the public IP is dynamically assigned to the home router by the Internet Service Provider.

In table 1 below, a possible table upload for a corporation that deploys two separate networks (wired with egress internet gateway with public IP address W.X.Y.Z) and a wireless network with egress internet gateway with public IP address A.B.C.D) is shown.

| Internet Gateway IP | Private IP | Location | Latitude | Longitude | Precision range |
|---|---|---|---|---|---|
| A.B.C.D | 10.10.1.0/24 | building | la1 | lo1 | 150 meters |
| W.X.Y.Z | 172.16.5.0/24 | 1$^{st}$ floor | la2 | lo2 | 50 meters |
| W.X.Y.Z | 172.16.5.0/30 | kitchen on 1$^{st}$ floor | la3 | lo3 | 5 meters |

It should be appreciated that each gateway can be a communication device that includes hardware. The hardware can include at least one processor connected to a non-transitory computer readable medium (e.g. flash memory, etc.) and at least one transceiver. The non-transitory computer readable medium of the gateway can include at least one application stored thereon that defines a method or other type of functionality that is performed by the gateway when the application is run by the processor.

Referring now, in particular, to the embodiment illustrated in FIG. 1, as mentioned above, the best effort location is determined for the client A (indicated by reference numeral 1), which is used by a user who, for example, wants to make an emergency call and thus needs to provide data on his exact location to the emergency service. Therefore, at first, the client A sends a STUN request on each of the interfaces available to it, here, these are two interfaces, the first interface 4 and the second interface 5. Thus, the STUN BINDING request is sent to the STUN server 3, exiting the private network 2 via the first interface 4 of a Local Area Network (LAN) with Network Address Translation NAT with the public IP address: A.B.C.D. The STUN server 3 returns the MAPPED_ADDRESS A.B.C.D to the requestor (here, client A via the first interface 4). The client A, upon receipt of the STUN BINDING response, ends the private IP address (a.b.c.d) along with the mapped public IP address (A.B.C.D) to the location server 6 which looks up the location for the private IP address a.b.c.d within the ranges uploaded for the public IP address A.B.C.D and sends back first location data comprising the actual location "building", the latitude data la1 and the longitude data lo1 as well as a precision range of 150 meters (see table 1 above).

Also, the STUN request is sent to the STUN server 3, exiting the private network 2 via the second interface 5 on the internet gateway for a Wireless Local Area Network WLAN with Network Address Translation NAT with public IP address: X.Y.Z.W. The STUN server 3 also returns the MAPPED_ADDRESS X.Y.Z.W to the requestor, namely, the client A via the second interface 5. The client A, upon receipt of the STUN BINDING response, sends the private IP address (x.y.z.w) along with the mapped public IP address (X.Y.Z.W) to the location server 6, which again looks up the location for the private IP address x.y.z.w within the ranges uploaded for the public IP address X.Y.Z.W and sends back second location data for the private IP address x.y.z.w comprising the actual location "1st floor", the latitude data la2 and the longitude data lo2, as well as a precision range of 50 meters (see table 1 above) to the requestor, namely, to client A.

The client A then determines the best effort location by verifying which precision received is the lowest. Here, this is the precision of 50 meters comprised in the second location data, and uses the associated location, latitude data and longitude data. For example, when making an emergency call as mentioned above, the location data is sent or transmitted together with the call to the emergency service so as to enable the latter to provide fast and efficient help.

It should be appreciated from that above that reference numerals utilized in FIG. 1 and also referenced herein include:
1 client A
2 private network
3 STUN server
4 first interface
5 second interface
6 location server It is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunications apparatus, a communication device, a communication system, and methods of making and using the same have been shown and described above, it is to be distinctly understood that the invention is not limited thereto but may be otherwise variously embodied and practiced within the scope of the following claims.

The invention claimed is:

1. A method of determining a location of a client in a private network, the method comprising:
   sending, from the client via a plurality of interfaces available to the client, a plurality of STUN BINDING requests to a STUN server connected to a public internet, each STUN BINDING request of the plurality of STUN BINDING requests exiting the private network through an internet gateway of a plurality of internet gateways coupling the private network to the public network, wherein at least two of the plurality of STUN BINDING request exit the private network through different internet gateways of the plurality of internet gateways,
   in response to the plurality of STUN BINDING requests, receiving, at the client via the plurality of interfaces, a plurality of STUN BINDING responses from the STUN server, each STUN BINDING response of the plurality of STUN BINDING responses comprising a public IP address mapped by the STUN server to the internet gateway of the plurality of internet gateways through which a corresponding STUN BINDING request of the plurality of STUN BINDING requests exited the private network,
   sending, from the client via the plurality of internet gateways, a plurality of location requests to a location server, each location request of the plurality of location requests comprising a public IP address of the public IP addresses received in the plurality of STUN BINDING responses and a private IP address corresponding to one of the plurality of interfaces of the client using the internet gateway corresponding to the public IP address to couple with the public network, wherein the location server looks up geolocation data including information identifying a physical geographical location and a precision range mapped to the private IP address within a range for the public IP address included in the location request, and
   receiving, at the client via the plurality of internet gateways, a plurality of location responses from the location server, each location response of the plurality of location responses comprising the looked up geolocation data related to the private IP address and the public IP address in a respective location request of the plurality of location requests to which the location response responds.

2. The method according to claim 1, wherein the step of sending, from the client via the plurality of interfaces available to the client, the plurality of STUN BINDING requests to the STUN server comprises sending a first the STUN BINDING request of the plurality of STUN BINDING requests to the STUN server via a first interface of the plurality of interfaces and a first internet gateway of the plurality of internet gateways.

3. The method according to claim 2, wherein the first internet gateway is an internet gateway for a local area network (LAN) with network address translation (NAT).

4. The method according to claim 2, wherein the step of sending, from the client via the plurality of interfaces available to the client, the plurality of the STUN BINDING requests to the STUN server further comprises sending a second STUN BINDING request of the plurality of STUN BINDING requests to the STUN server via a second interface of the plurality of interfaces and a second internet gateway of the plurality of internet gateways.

5. The method according to claim 4, wherein the second internet gateway is an internet gateway for a wireless local area network (WLAN) with network address translation (NAT).

6. The method according to claim 1, wherein the information identifying the physical geographical location comprises a location name and corresponding geolocation data the includes latitude data and longitude data specifying the physical geographic location.

7. The method according to claim 1, wherein the geolocation data is retrieved from at least one table stored on the location server, wherein in the at least one table, ranges for a plurality of private IP addresses within the private network are mapped to a plurality of public IP addresses with a precision range value.

8. The method according to claim 7, wherein the method further comprises:
   selecting, by the client, geolocation data with a lowest precision range value.

9. The method according to claim 8, wherein the method further comprises: transmitting, by the client, the selected geolocation data to an emergency service.

10. The method according to claim 1, wherein a location determination service provided on the location server uses Geo IP lookup tables to determine geolocation data for the public IP addresses in response to a public IP address being omitted from at least one table stored on the location server.

11. A communication network, comprising:
- at least one client in a private network, a STUN server connected to a public internet and a location server, wherein the at least one client is configured to:
- send a plurality of STUN BINDING requests to the STUN server connected to the public internet via a plurality of interfaces available to the client, each STUN BINDING request of the plurality of STUN BINDING requests exiting the private network through an internet gateway of a plurality of internet gateways coupling the private network to the public internet, wherein at least two of the plurality of STUN BINDING requests are sent such that they exit the private network through different internet gateways of the plurality of internet gateways,
- receive, via the plurality of interfaces, a plurality of STUN BINDING responses from the STUN server that respond to the plurality of STUN BINDING requests, each STUN BINDING response of the plurality of STUN BINDING responses comprising a public IP address mapped by the STUN server to the internet gateway of the plurality of internet gateways through which a corresponding STUN BINDING request of the plurality of STUN BINDING requests exited the private network,
- send, via the plurality of internet gateways, a plurality of location requests to the location server, each location request of the plurality of location request sent to the location server comprising a public IP address of the public IP addresses received in the plurality of STUN BINDING responses and a private IP address corresponding to one of the plurality of interfaces of the client using the internet gateway corresponding to the public IP address to couple with the public network, the location server configured to look up geolocation data including information identifying a physical geographical location and a precision range mapped to the private IP address within a range for the public IP address included in the location request, and
- receive a plurality of location responses from the location server via the plurality of internet gateways that respond to the plurality of location requests, each location response of the plurality of location responses comprising the looked up geolocation data related to the private IP address and the public IP address in a respective location request of the plurality of location requests to which the location response responds.

* * * * *